US012595997B2

(12) United States Patent
Lee et al.

(10) Patent No.: US 12,595,997 B2
(45) Date of Patent: Apr. 7, 2026

(54) APPARATUS AND METHOD FOR CHECKING FOR MIS-ASSEMBLY OF BATTERY CELL ACTIVATION TRAY OR TWISTING THEREOF DURING OPERATION

(71) Applicant: LG ENERGY SOLUTION, LTD., Seoul (KR)

(72) Inventors: Han Jin Lee, Daejeon (KR); Eunhee Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 405 days.

(21) Appl. No.: 18/032,637

(22) PCT Filed: Jun. 14, 2022

(86) PCT No.: PCT/KR2022/095106
§ 371 (c)(1),
(2) Date: Apr. 19, 2023

(87) PCT Pub. No.: WO2022/265482
PCT Pub. Date: Dec. 22, 2022

(65) Prior Publication Data
US 2023/0408241 A1 Dec. 21, 2023

(30) Foreign Application Priority Data
Jun. 15, 2021 (KR) ........................ 10-2021-0077120

(51) Int. Cl.
*G01B 5/25* (2006.01)
*H01M 10/04* (2006.01)
*H01M 50/20* (2021.01)

(52) U.S. Cl.
CPC .......... *G01B 5/25* (2013.01); *H01M 10/0404* (2013.01); *H01M 50/20* (2021.01)

(58) Field of Classification Search
CPC .... G01B 5/25; H01M 50/20; H01M 10/0404; H01M 10/446; H01M 10/4285; H01M 50/204

(Continued)

(56) References Cited

U.S. PATENT DOCUMENTS

| | | | | |
|---|---|---|---|---|
| 2,021,273 | A | * | 11/1935 | Vallinos ................. A24F 15/12 |
| | | | | 206/265 |
| 5,914,609 | A | * | 6/1999 | Curry .................... H02J 7/0047 |
| | | | | 324/601 |
| 8,519,715 | B2 | * | 8/2013 | Toomre ............... H01M 50/227 |
| | | | | 324/426 |

FOREIGN PATENT DOCUMENTS

| | | |
|---|---|---|
| CN | 110444702 A | 11/2019 |
| JP | 2017-20863 A | 1/2017 |

(Continued)

OTHER PUBLICATIONS

International Search Report (PCT/ISA/210) issued in PCT/KR2022/095106, dated Sep. 16, 2022.

(Continued)

*Primary Examiner* — Peter J Macchiarolo
*Assistant Examiner* — Anna Josephine Saunders
(74) *Attorney, Agent, or Firm* — Birch, Stewart, Kolasch & Birch, LLP

(57) ABSTRACT

A check device and method for checking for misalignment or twisting during operation of a battery cell activation tray is provided where the cell activation tray includes an external tray having a fence and an inner tray for accommodating a battery cell fixed at a predetermined distance from the fence on a bottom of the external tray. The check device includes an upper pillar portion and a lower pillar portion extending from the upper pillar portion. The upper pillar portion has a thickness greater than a predetermined separation distance and the lower pillar portion has a thickness smaller than the predetermined separation distance. A first surface of the check device is planar and a second surface of the check device opposite the first surface has a step portion corresponding to a thickness difference between the thickness of the upper pillar portion and the thickness of the lower pillar portion.

7 Claims, 10 Drawing Sheets

(58) Field of Classification Search
USPC ............................................ 33/533; 324/426
See application file for complete search history.

(56)                    References Cited

FOREIGN PATENT DOCUMENTS

| JP | 2020-119823 A | 8/2020 | |
|----|----|----|----|
| KR | 10-1067036 B1 | 9/2011 | |
| KR | 101076412 B1 * | 10/2011 | ........... H01M 10/44 |
| KR | 10-2015-0044231 A | 4/2015 | |
| KR | 10-2016-0032530 A | 3/2016 | |
| KR | 10-2017-0074454 A | 6/2017 | |
| KR | 10-2018-0069248 A | 6/2018 | |
| KR | 10-2018-0076158 A | 7/2018 | |
| KR | 10-2021-0030089 A | 3/2021 | |
| WO | WO-2022265482 A1 * | 12/2022 | ........... H01M 50/20 |

OTHER PUBLICATIONS

Extended European Search Report for European Application No.
22825405.8, dated Jul. 5, 2024.

* cited by examiner

【Figure 1】
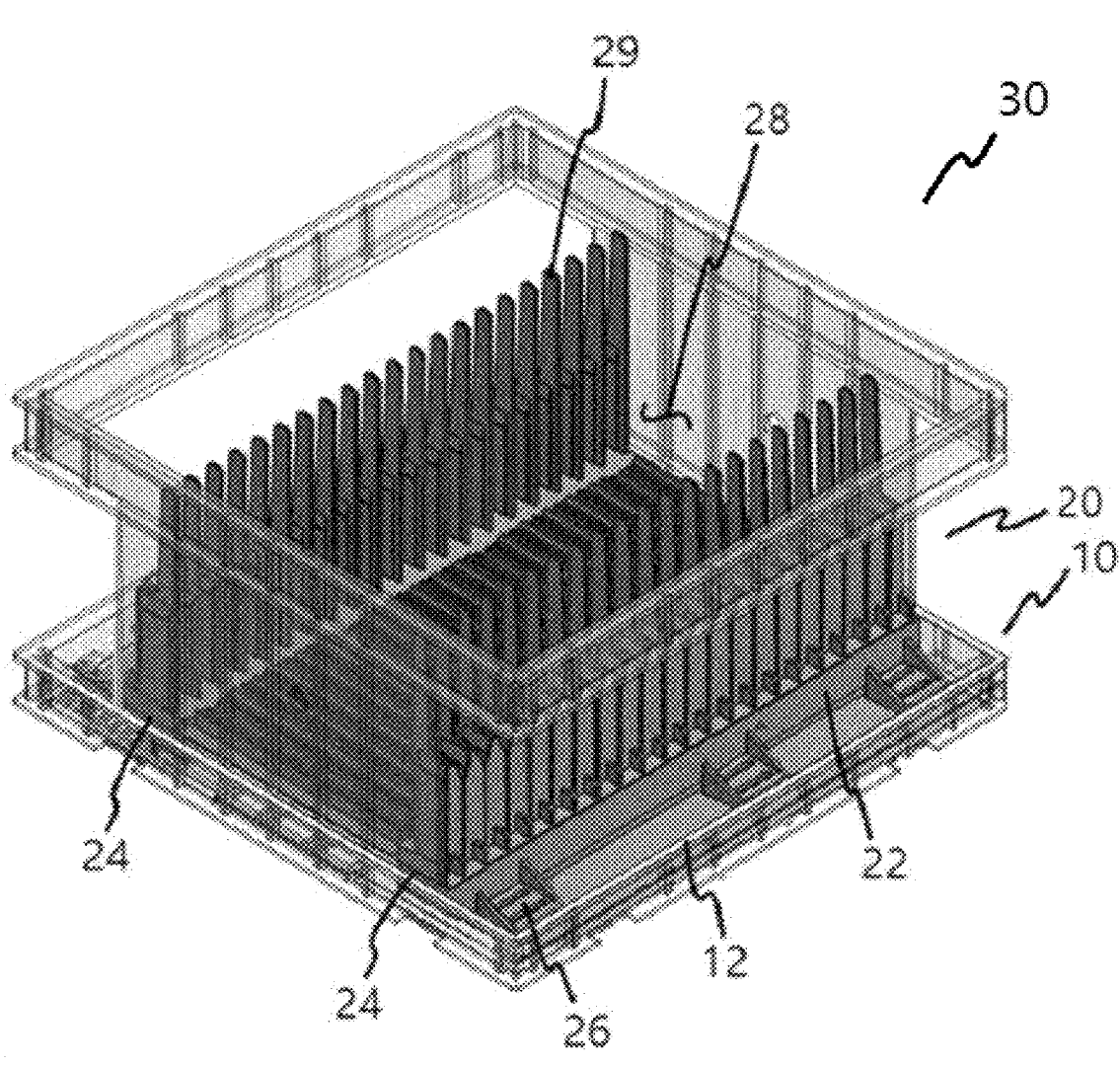

【Figure 2】
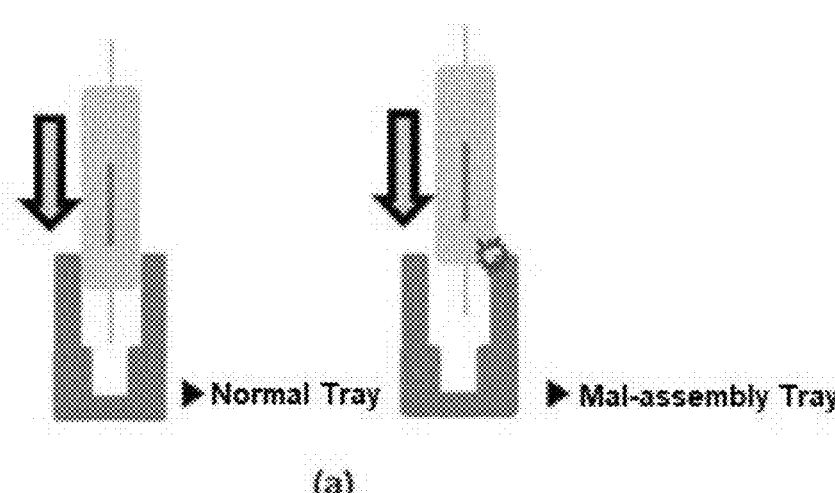
(a)
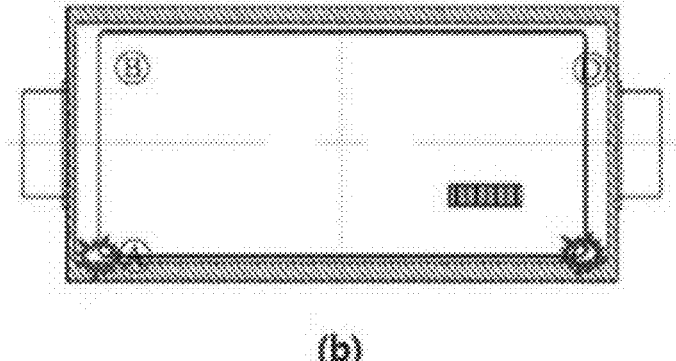
(b)
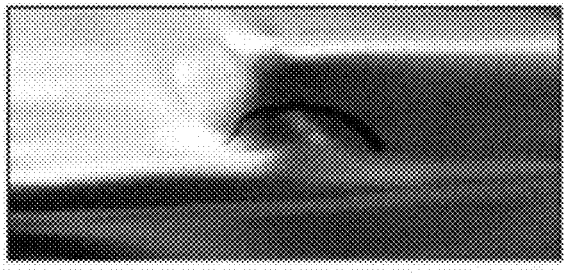
(c)

【Figure 3】
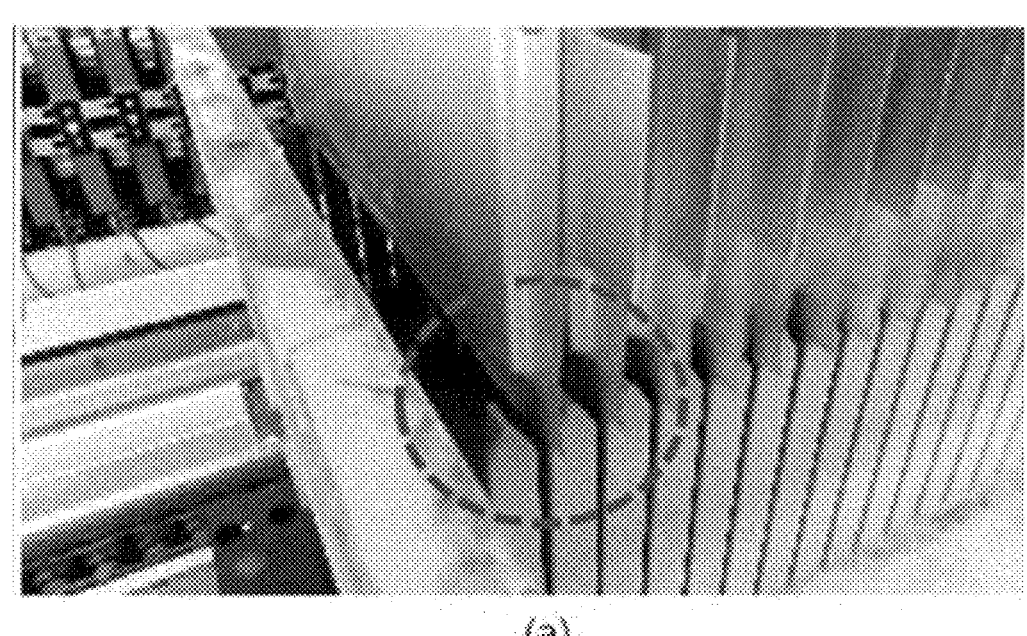
(a)
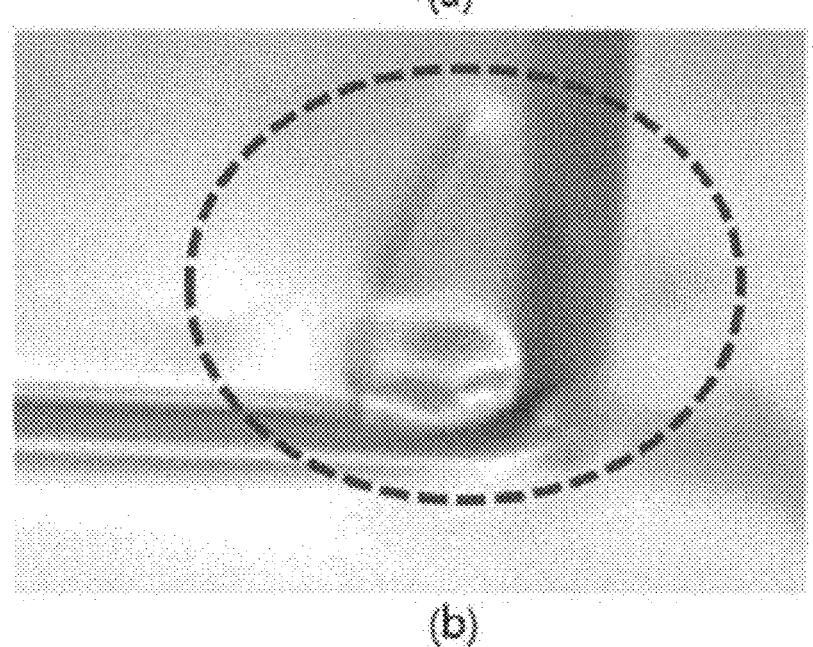
(b)

【Figure 4】
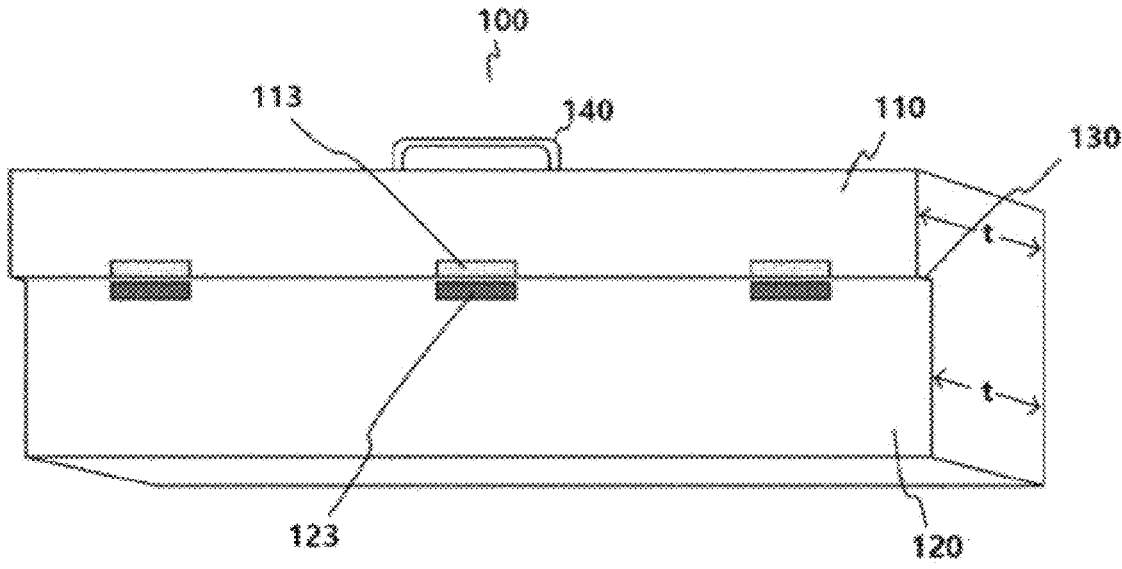
【Figure 5】
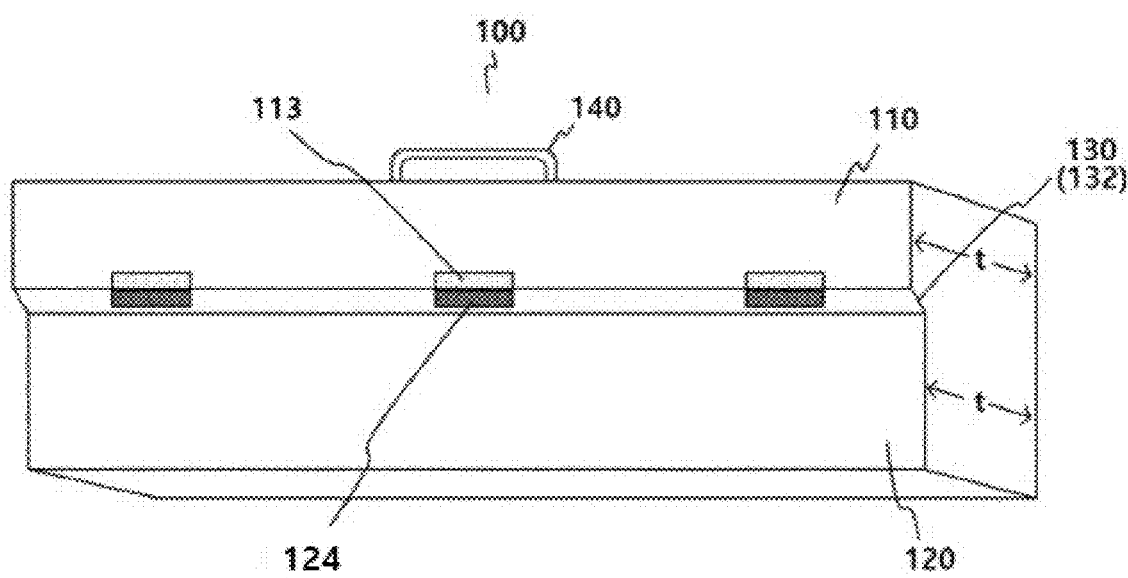

【Figure 6】
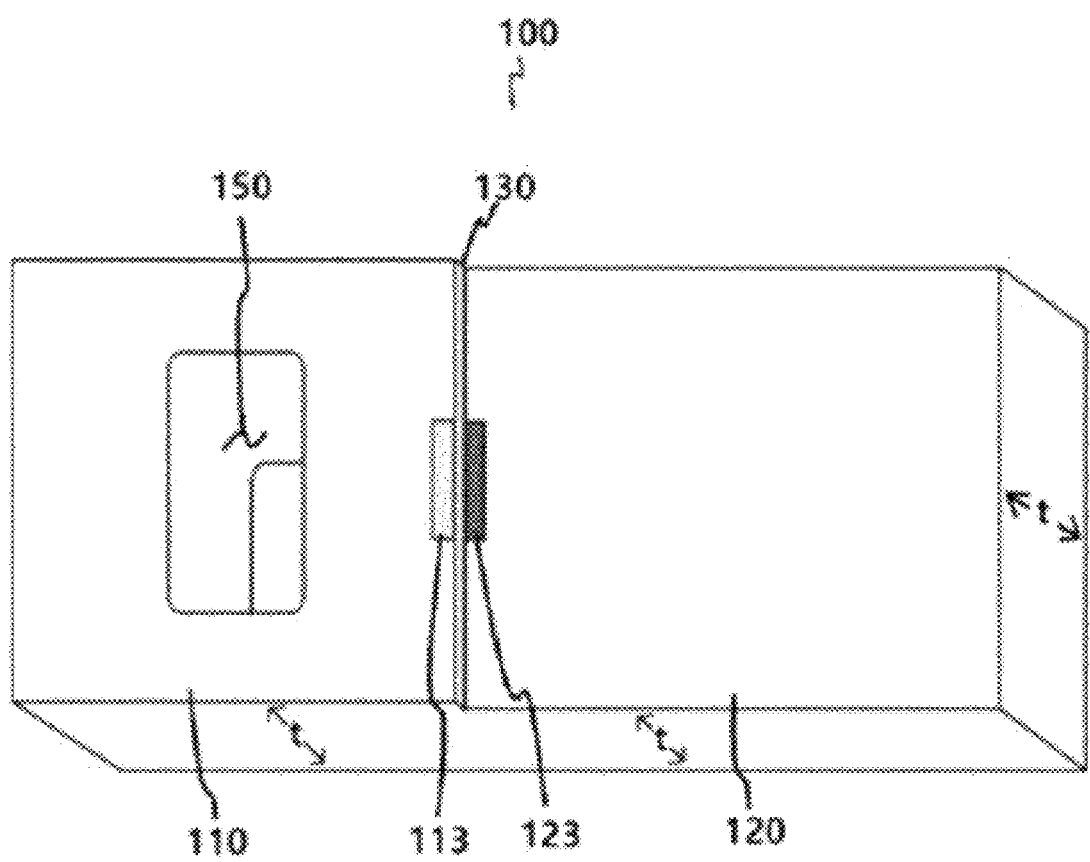

【Figure 7】
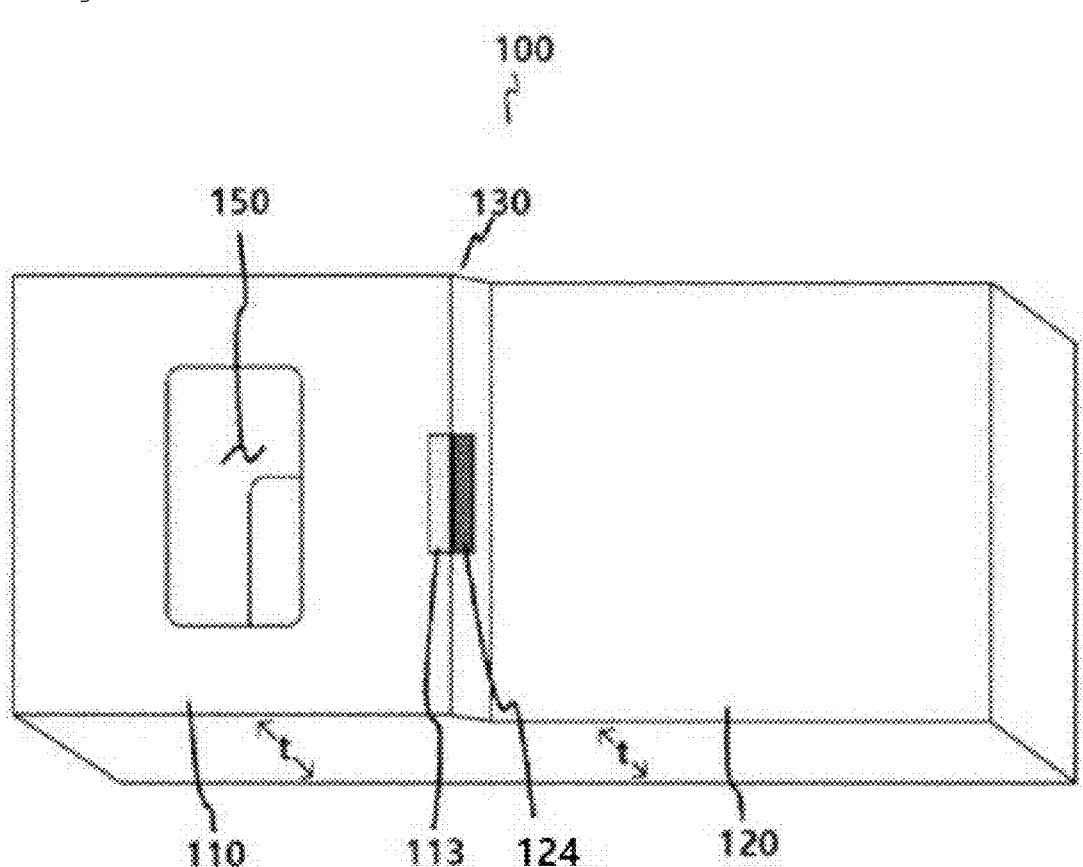

【Figure 8】
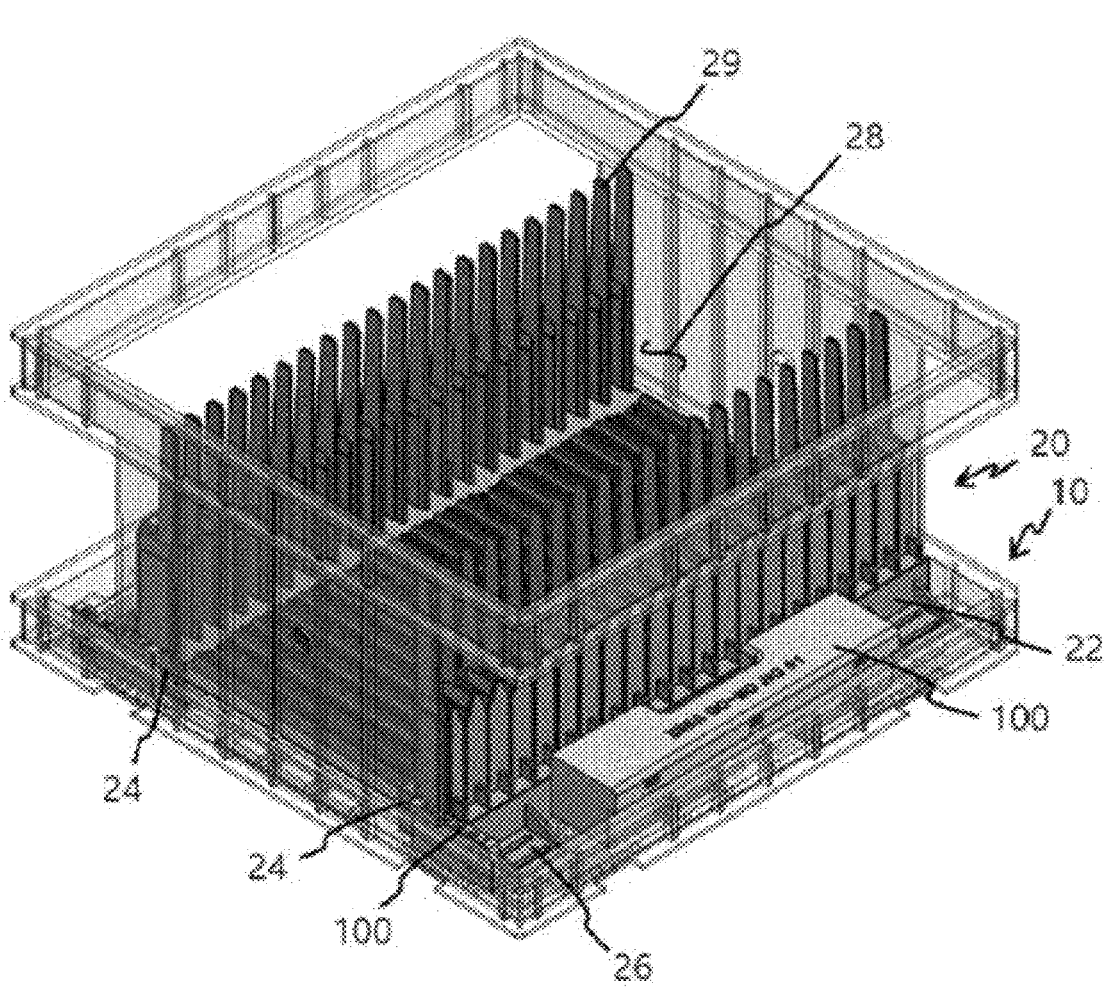

【Figure 9】
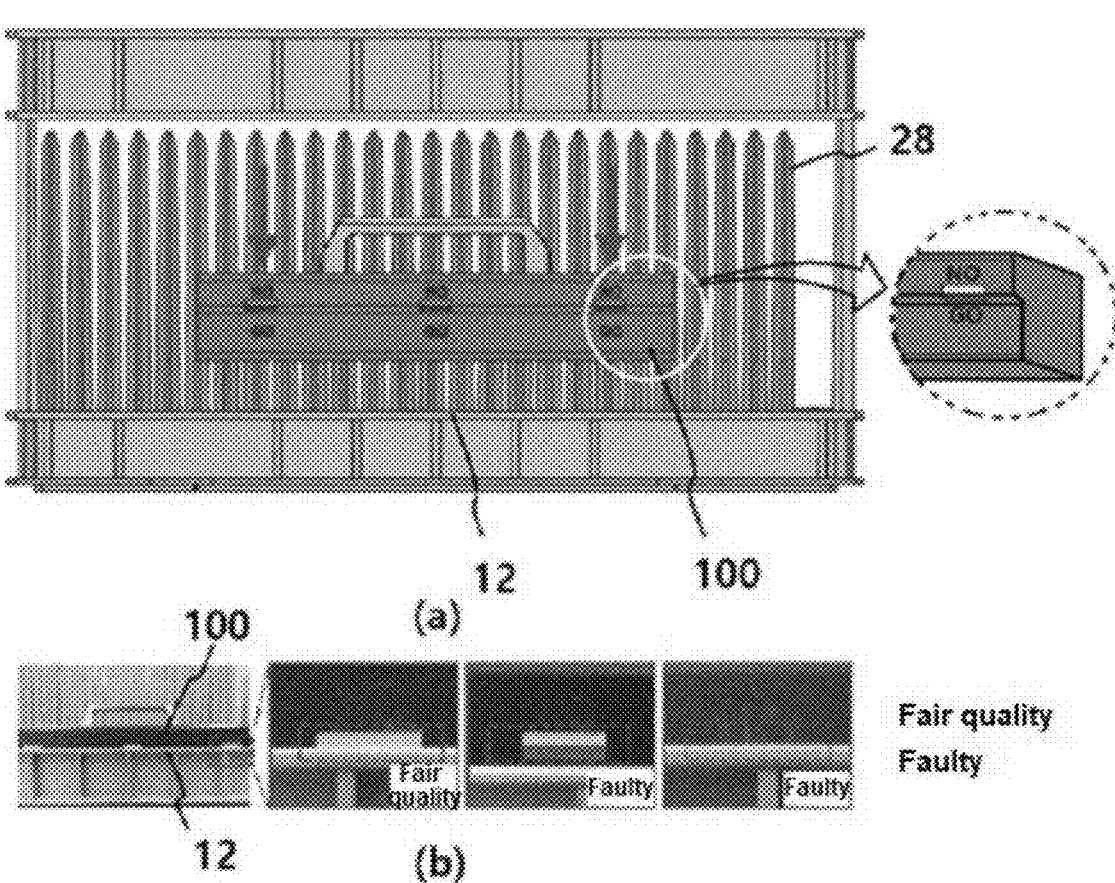
Fair quality
Faulty

【Figure 10】
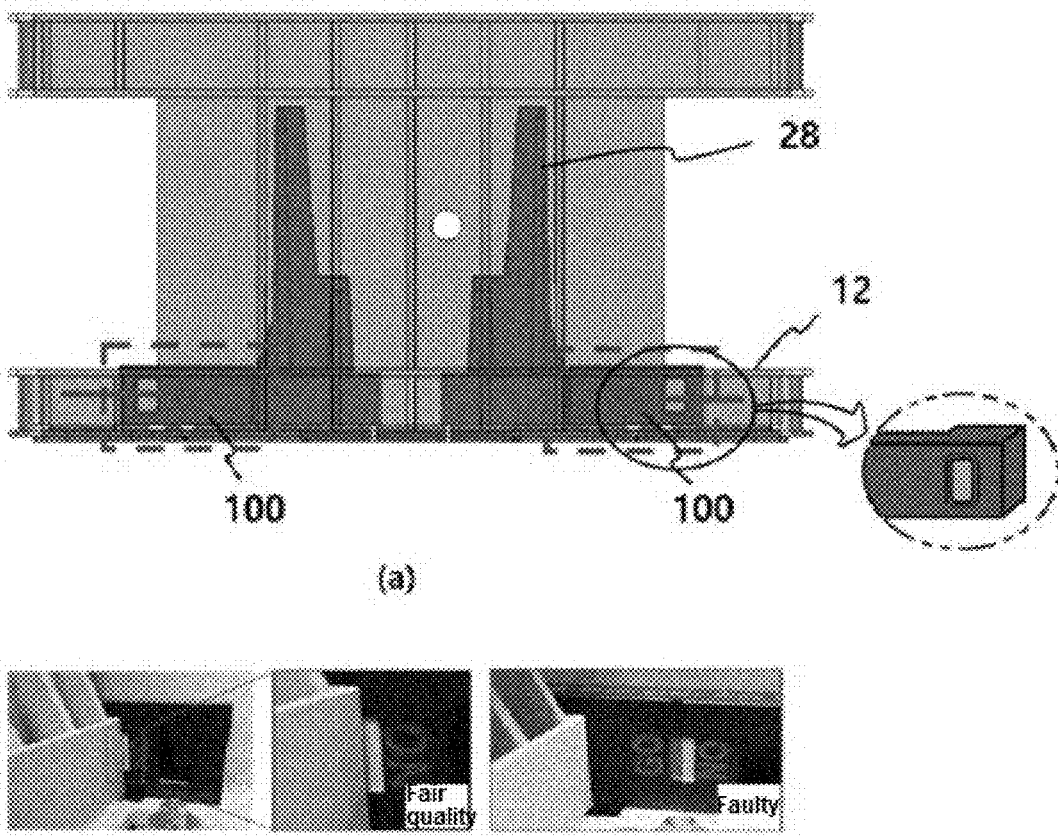
(a)
(b)
【Figure 11】
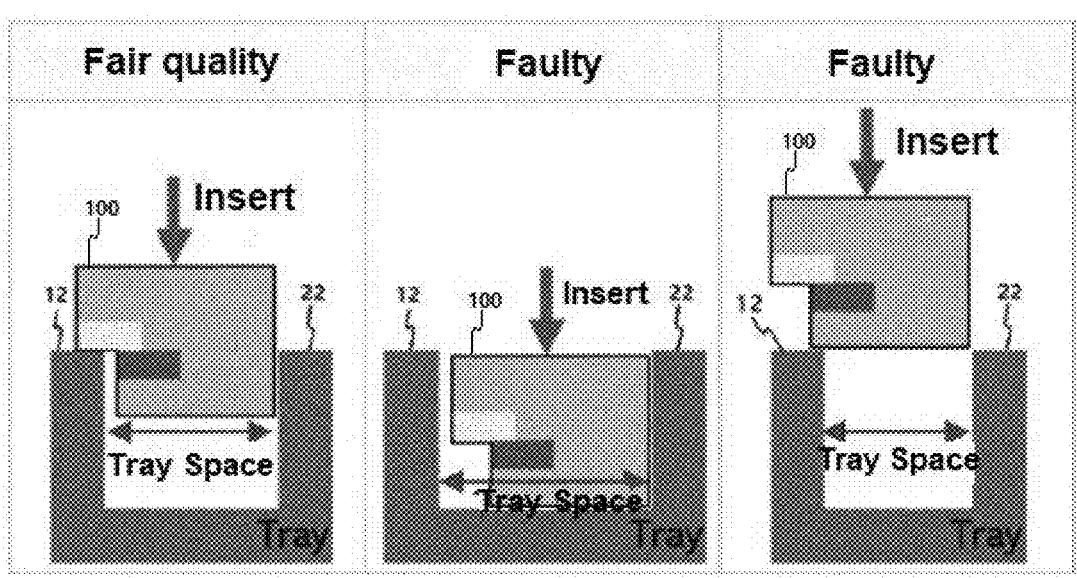

【Figure 12】
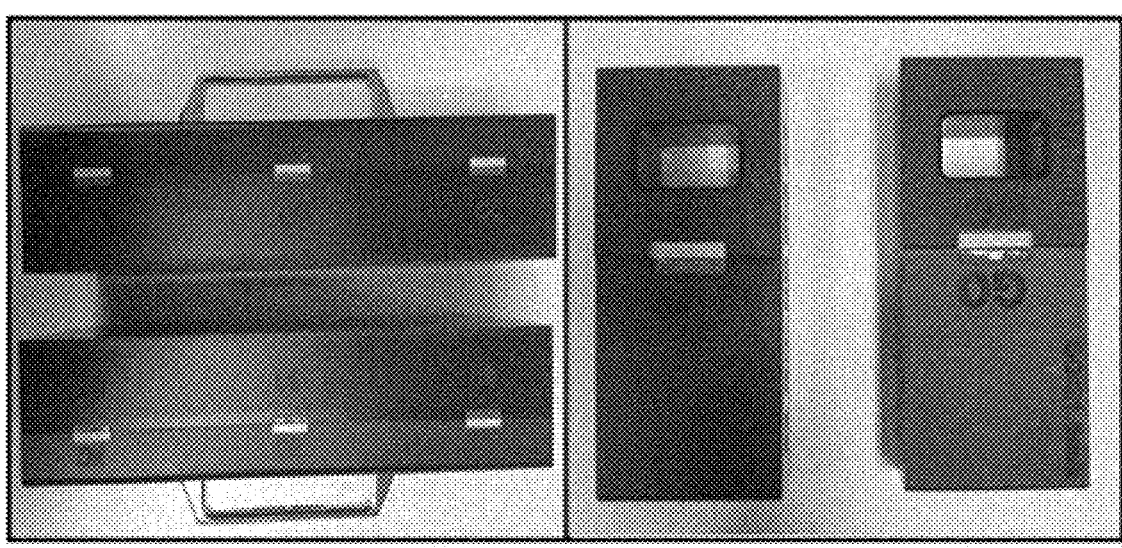

APPARATUS AND METHOD FOR CHECKING FOR MIS-ASSEMBLY OF BATTERY CELL ACTIVATION TRAY OR TWISTING THEREOF DURING OPERATION

The present application claims the benefit of priority based on Korean Patent Application No. 10-2021-0077120 filed on Jun. 15, 2021, the entire contents of which are incorporated herein by reference.

TECHNICAL FIELD

The present invention relates to a check device and a check method for the mal-assembly or the twisting during operation of the battery cell activation tray.

BACKGROUND ART

As technology development and demand for mobile devices are increased, the demand for secondary batteries as an energy source is rapidly increasing, and among these secondary batteries, a lot of research has been conducted on a lithium secondary battery with high energy density and discharging voltage, and it is now commercialized and widely used.

In the case of the secondary batteries, depending on the shape of the battery case, they are classified into a cylindrical battery and a prismatic battery in which the electrode assembly is embedded in a cylindrical or prismatic metal can, and a pouch-type battery in which the electrode assembly is embedded in a pouch-type case made of an aluminum laminate sheet.

In addition, the electrode assembly embedded in the battery case is a chargeable power generating element consisting of a stacked structure of positive electrode/separator/negative electrode, and are classified into a jelly-roll type obtained by interposing a separator between the positive and negative electrodes of a long sheet type coated with an active material and then winding it, and a stack type obtained by sequentially stacking a plurality of positive and negative electrodes of a predetermined size with a separator interposed therebetween.

In general, in manufacturing a lithium secondary battery, first, a material mixed with an active material, a binder and a plasticizer is applied to a positive electrode current collector and a negative electrode current collector to prepare a positive electrode and a negative electrode, and then these are laminated on both sides of the separator to form a battery cell of a predetermined shape, and then the battery cell is inserted into the battery case and sealed. In addition, in order to determine whether the secondary battery is faulty and to secure performance, in particular, stability of lifespan, the activation process is always performed before shipment of the product.

The activation process is a process of activating a battery and removing gas by repeating charging and discharging. In order to perform the activation process, a process of inserting battery cells into the activation tray as shown in FIG. 1 is performed, and after the activation process is completed, the battery cells are taken out from the activation tray.

The activation tray is composed of an inner tray 20 on which the battery cell is mounted and an external tray 10 on which the inner tray is fixed. However, the activation tray may be incorrectly assembled when the inner tray 20 and the external tray 10 are assembled, and also, during operation (during the performing of the activation process), the inner tray 20 may be twisted from the external tray 10.

If the battery cells are inserted in and taken out from the tray incorrectly assembled as above, or from the activation tray whose inner tray is twisted during the activation process, the inner tray collides with the battery cells, and external dents, scratches, cracks, etc. may occur on the battery cells, as shown in FIGS. 2 and 3. These damage to the cells may cause the deterioration of the quality of the battery cell and cause the failure of the equipment.

Therefore, there is a need for a method that can effectively detect the mal-assembly and the twisting during operation of the activation tray.

PRIOR ART DOCUMENT

Patent Document

Korean Laid-open Patent Publication No. 10-2021-0030089

DISCLOSURE

Technical Problem

The present invention has been devised to solve the above problems of the prior art, and it is an object of the present invention to provide a check device that can check the mal-assembly or the twisting during operation of the battery cell activation tray very simply and effectively.

In addition, it is another object of the present invention to provide a check method that can check the mal-assembly or the twisting during operation of the battery cell activation tray very simply and effectively using the check device described above.

Technical Solution

In order to achieve the above objects, the present invention provides a check device for checking for the occurrence of misalignment or twisting during operation of a battery cell activation tray, the battery cell activation tray including an external tray having a fence on an outer periphery of the external tray; and an inner tray for accommodating a battery cell fixed at a predetermined distance from the fence on a bottom of the external tray, in which a separation distance exists between the fence and a vertical sidewall of the inner tray facing, the fence to define a separation space.

The check device comprises an upper pillar portion; and a lower pillar portion extending from the upper pillar portion, wherein the upper pillar portion has a thickness greater than the a predetermined separation distance, the lower pillar portion has a thickness smaller than the predetermined separation distance, and wherein a first surface of the check device is planar and a second surface of the check device opposite the first surface has a step portion corresponding to a thickness difference between the thickness of the upper pillar portion and the thickness of the lower pillar portion.

In addition, the present invention provides a method for checking for misalignment or during operation of the battery cell activation tray using the check device, comprising the steps of, preparing the battery cell activation tray;

inserting the check device into the separation space between the fence and the vertical sidewall of the inner tray from the lower pillar portion from top to bottom in a state where the first surface is placed in contact with the vertical sidewall of the inner tray; and determining a case that, when the the lower pillar portion is inserted into the separation space and the upper pillar portion is caught on the fence, as normal, and a case that, when the the lower pillar portion is caught on the fence or the upper pillar portion is inserted into the separation space, as abnormal, in the process of inserting the check device.

In addition, the present invention provides a method for checking for misalignment or twisting during operation of the battery cell activation tray using the check device, comprising the steps of, preparing the battery cell activation tray;

inserting the check device into the separation space between the fence and the vertical sidewall of the inner tray from the lower pillar portion from a distal edge of the inner tray toward a center of the vertical sidewall of the inner tray, in a state where the first surface is placed in contact with the fence adjacent to the distal edge of the inner tray; and determining a case that, when the lower pillar portion is inserted into the separation space and the upper pillar portion is caught on the vertical sidewall of the inner tray, as normal, and a case that, when the lower pillar portion is caught on the vertical sidewall of the inner tray or the upper pillar portion is inserted into the separation space, as abnormal, in the process of inserting the check device.

Advantageous Effects

If the check device of the present invention is used, the mal-assembly or the twisting during operation of the inner tray of the activation tray can be checked very simply and effectively.

In addition, according to the check method of the present invention, the mal-assembly or the twisting during operation of the inner tray of the activation tray can be checked very simply and effectively.

In addition, when inserting the battery cell into the activation tray or removing it, the above check device and check method can effectively solve the problem that the battery cell collides with the inner tray and external dents, scratches, cracks, etc. occur on the battery cell.

DESCRIPTION OF DRAWINGS

FIG. 1 is a perspective view showing the structure of the battery cell activation tray.

FIG. 2 is a view showing a problem that occurs when the battery cell is inserted into the activation tray in which the inner tray is mal-assembled or twisted.

FIG. 3 is a photograph showing the battery cell mounted on the activation tray and the shape of the battery cell damaged in that process.

FIGS. 4 to 7 are perspective views illustrating an embodiment of the check device for mal-assembly or the twisting during operation of the battery cell activation tray according to an embodiment of the present invention.

FIG. 8 is a perspective view showing the state of use of the check device for the mal-assembly or the twisting during operation of the battery cell activation tray according to an embodiment of the present invention.

FIGS. 9 and 10 are cross-sectional views showing the state of use of the check device for the mal-assembly or the twisting during operation of the battery cell activation tray according to an embodiment of the present invention.

FIG. 11 is a diagram schematically illustrating a criterion for discrimination as normal or abnormal, when using the check device for the mal-assembly or the twisting during operation of the battery cell activation tray according to an embodiment of the present invention.

FIG. 12 is a photograph of the check device for the mal-assembly or the twisting during operation of the battery cell activation tray according to an embodiment of the present invention.

BEST MODE

Hereinafter, embodiments of the present invention will be described in detail with reference to the accompanying drawings so that those skilled in the art to which the present invention pertains can easily practice the present invention. However, the present invention may be embodied in several different forms and is not limited to the embodiments described herein. Throughout the specification, like reference numerals are assigned to like parts.

FIG. 1 is a perspective view showing the structure of the battery cell activation tray. As shown in FIG. 1, the activation tray is composed of an inner tray 20 on which the battery cell is mounted and an external tray 10 on which the inner tray is fixed. However, the activation tray may be incorrectly assembled when assembling the inner tray 20 and the external tray 10, and also during operation (during the execution of the activation process), a case in which the inner tray 20 is twisted in the external tray 10 occurs.

When inserting and taking out battery cells into the activation tray whose inner tray is twisted, on the tray misassembled as above or during the activation process, the inner tray and the battery cell may collide, causing external dents, scratches, and cracks in the battery cell, as shown in FIGS. 2 and 3. These damages to the cell can cause the deterioration of the quality of the battery cell and cause the failure of the equipment.

One embodiment of the present invention provides a check device and check method for the mal-assembly or the twisting during operation of the battery cell activation tray, which can effectively improve the above problems.

In an embodiment of the present invention, the check device 100 for the mal-assembly or the twisting during operation of the battery cell activation tray is a check device 100 that checks the occurrence of mal-assembly or the twisting during operation of the battery cell activation tray 30, which comprises an external tray 10 equipped with a fence on the outer periphery of the external tray; and an inner tray 20 for accommodating a battery cell fixed at a predetermined distance from the fence on the bottom surface of the external tray, as shown in FIG. 1, wherein a certain separation distance exists between the fence 12 provided in the external tray 10 and the vertical direction structures 22 and 24 of the inner tray facing away from the fence.

The check device 100 comprises an upper pillar portion 110 and a lower pillar portion 120 extending from the upper pillar portion, as shown in FIGS. 4 to 7, the upper pillar portion 110 has a thickness greater than the standard of the separation distance, the lower pillar portion 120 has a thickness smaller than the standard of the separation distance, one surface of the upper pillar portion 110 and the lower pillar portion 120, which is the basis of the thickness, forms a single plane, and a step 130 corresponding to the thickness difference is formed on the other surface serving as a basis for the thickness.

In the above, the "standard of separation distance" refers to a standard in which the separation distance between the fence 12 provided in the external tray 10 and the vertical direction structures 22 and 24 of the inner tray facing away from the fence is defined in advance as a predetermined length.

Each of the upper pillar portion 110 and the lower pillar portion 120 may have a uniform thickness, but is not limited thereto, and if the thickness of the portion adjacent to the step 130 satisfies the above-mentioned thickness criterion, a desired effect may be obtained.

The upper pillar portion and the lower pillar portion extending from the upper pillar portion may have the shape of a polygonal column, a cylinder, an elliptical column, etc., and among them, it can be convenient to use in the case of a polygonal column, and in particular, it can be used more conveniently if it has a shape similar to a rectangular column.

The upper pillar portion 110 may have a thickness of 100.01% to 110% compared to the standard of the separation distance, and the lower pillar portion 120 may have a thickness of 90% to 99.99% compared to the standard of the separation distance, but is not limited thereto.

The check device 100 may comprise a form as shown in FIGS. 4 and 5 applied to the side surface of the battery cell activation tray and a form as shown in FIGS. 6 and 7 applied to the rear surface (end surface of the inner tray).

The check device 100 may be made of various materials such as metal, polymer, wood, etc., and the material thereof is not particularly limited.

In the case of the check device 100, when checking the occurrence of the mal-assembly or the twisting during operation of the battery cell activation tray, as shown in FIGS. 8 and 9, the check device is inserted into the separation space formed between the fence 12 and the vertical direction structures 22 and 24 of the inner tray from the lower pillar portion in a top-down direction, in a state where the portion forming the single plane is placed in contact with one side 22 in the longitudinal direction of the inner tray. At this time, as shown in FIGS. 9 and 11, if the lower pillar portion 120 is inserted and the upper pillar portion 110 is caught in the fence 12, the check device provides a criterion for discrimination as normal, and if the lower pillar portion 120 is caught in the fence 12 or the upper pillar portion 110 is inserted into the space, it provides a criterion for discrimination as abnormal.

In the case of the check device 100, when checking the occurrence of the mal-assembly or the twisting during operation of the battery cell activation tray, as shown in FIGS. 8 and 10, the check device is inserted from the lower pillar portion 120 to the separation space formed between the fence 12 and the vertical direction structures 22 and 24 of the inner tray from the edge of the inner tray 20 to the center in the end surface of the inner tray, in a state where the portion forming the single plane is placed in contact with the fence 12 adjacent to the edge of the distal end 24 of the inner tray 20. At this time, if the lower pillar portion 120 is inserted and the upper pillar portion 110 is caught in the vertical direction structures 22 and 24 of the inner tray, the check device provides a criterion for discrimination as normal, and if the lower pillar portion 120 is caught in the vertical direction structures 22 and 24 of the inner tray or the upper pillar portion 110 is inserted into the space, it provides a criterion for discrimination as abnormal.

The step difference 130 between the upper pillar portion 110 and the lower pillar portion 120 may be formed to have an inclined surface 132, as shown in FIGS. 5 and 7, and the inclined surface 132 may be formed in a form that gradually reduces the thickness of the upper pillar portion.

If the inclined surface 132 is formed as described above, it is preferable because the degree of mal-assembly or the degree of the twisting during operation of the tray can be easily measured.

At the lower end of the upper pillar portion 110 of the surface on which the step difference 130 of the check device is formed, a color marker 113 for identification as normal may be provided, as shown in FIGS. 4 and 6.

In addition, at the upper end of the lower pillar portion 120 of the surface where the step difference 130 of the check device is formed, a color marker 123 for identification as abnormal may be provided.

If a color marker is provided as described above, it is preferable because normal or abnormal can be determined more accurately and conveniently.

In addition, as shown in FIGS. 5 and 7, at the lower end of the upper pillar portion 110 of the surface on which the step difference 130 of the check device is formed, a color marker 113 for identification as normal may be provided, and the inclined surface 132 may be characterized in that a color marker (124) for identification as normal is provided.

In addition, in an embodiment of the present invention, the check method for the mal-assembly or the twisting during operation of the battery cell activation tray is a check method for the mal-assembly or the twisting during operation of the battery cell activation tray using the check device of the present invention, characterized in that it includes, (a) preparing a battery cell activation tray which comprises an external tray equipped with a fence on the outer periphery of the external tray; and an inner tray for accommodating a battery cell fixed at a predetermined distance from a part or all of the fence on the bottom surface of the external tray, wherein a certain separation distance exists between the fence provided in the external tray and the vertical direction structure of the inner tray facing away from the fence;

(b) inserting the check device into the space formed between the fence and the vertical direction structure of the inner tray from the lower pillar portion in a top-down direction, in a state where the portion in which one surface of each of the upper pillar portion and the lower pillar portion, which is the basis of the thickness, forms a single plane, is placed in contact with the vertical direction structure of the inner tray; and (c) determining the case that the lower pillar portion is inserted and the upper pillar portion is caught in the fence, as normal, and the case that the lower pillar portion is caught in the fence or the upper pillar portion is inserted into the space, as abnormal, in the process of inserting the check device.

In addition, in an embodiment of the present invention, the check method for the mal-assembly or the twisting during operation of the battery cell activation tray is a check method for the mal-assembly or the twisting during operation of the battery cell activation tray using the check device of the present invention, characterized in that it comprises, (a) preparing a battery cell activation tray in which a certain separation distance exists between the fence provided in the external tray and the vertical direction structure of the inner tray facing away from the fence, which comprises an external tray equipped with a fence on the outer periphery of the external tray; and an inner tray for accommodating a battery cell fixed at a predetermined distance from a part or all of the fence on the bottom surface of the external tray;

(b) inserting the check device into the separation space formed between the fence and the vertical direction structure of the inner tray from the lower pillar portion in the direction from the edge of the inner tray toward the center of the end surface of the inner tray, in a state where the portion in which one surface of each of the upper pillar portion and the lower pillar portion, which is the basis of the thickness, forms a single plane, is placed in contact with the fence adjacent to the edge of the distal end of the inner tray; and (c) determining the case that the lower pillar portion is inserted and the upper pillar portion is caught in the vertical direction structure of the inner tray, as normal, and the case that the lower pillar portion is caught in the vertical direction structure of the inner tray or the upper pillar portion is inserted into the space, as abnormal, in the process of inserting the check device.

Although the present invention has been described in connection with the above-mentioned preferred embodiments, various modifications and variations can be made without departing from the spirit and scope of the invention. Accordingly, the appended claims are intended to cover such modifications and variations as fall within the scope of the present invention.

DESCRIPTION oF SYMBOL

10: External tray
12: External tray fence
20: Inner tray
22: vertical direction structure and one side in the longitudinal direction of the inner tray
24: vertical direction structure and distal end in the longitudinal direction of the inner tray
26: Inner tray fixing portion
28: Battery cell insertion space
29: Battery cell mounting pin
100: Check device
110: Upper pillar portion
113: Color marker for identification as normal
120: Lower pillar portion
123: Color marker for identification as abnormal
124: Color marker for identification as normal
130: Step difference portion
132: Inclined surface
140: Handle
150: Handle hole

The invention claimed is:

1. A check device for checking for misalignment or twisting during operation of a battery cell activation tray, the cell activation tray including an external tray having a fence on an outer periphery of the external tray; and an inner tray for accommodating a battery cell fixed at a predetermined distance from the fence on a bottom of the external tray, in which a separation distance exists between the fence and a vertical sidewall of the inner tray facing the fence to define a separation space, the check device comprising:

an upper pillar portion; and a lower pillar portion extending from the upper pillar portion, wherein the upper pillar portion has a thickness greater than a predetermined separation distance between the vertical sidewall of the inner tray and the fence of the external tray, wherein the lower pillar portion has a thickness smaller than the predetermined separation distance, wherein a first surface of the check device is planar and a second surface of the check device opposite the first surface has a step portion corresponding to a thickness difference between the thickness of the upper pillar portion and the thickness of the lower pillar portion, and wherein, when the check device is inserted into the separation space between the fence and the vertical sidewall from the lower pillar portion in a top-down direction, in a state where the first surface is placed in contact with one side in the longitudinal direction of the inner tray, if the lower pillar portion is inserted in the separation space and the upper pillar portion is caught on the fence, the check device provides a criterion for discrimination as normal, and if the lower pillar portion is caught on the fence or the upper pillar portion is inserted into the separation space, the check device provides a criterion for discrimination as abnormal, or wherein, when the check device is inserted from the lower pillar portion into the separation space between the fence and the vertical sidewall from a distal edge of the inner tray to a center in the vertical wall of the inner tray, in a state where the first surface is placed in contact with the fence adjacent to the distal edge of the inner tray, if the lower pillar portion is inserted into the separation space and the upper pillar portion is caught on the vertical sidewall of the inner tray, the check device provides a criterion for discrimination as normal, and if the lower pillar portion is caught on the vertical sidewall of the inner tray or the upper pillar portion is inserted into the separation space, the check device provides a criterion for discrimination as abnormal.

2. The check device according to claim 1, wherein the step portion between the upper pillar portion and the lower pillar portion includes an inclined surface such that the inclined surface gradually reduces the thickness of the upper pillar portion.

3. The check device according to claim 1, wherein a lower end of the upper pillar portion where the step portion of the check device is located is provided with a first color marker for identification as normal.

4. The check device according to claim 3, wherein an upper end of the lower pillar portion where the step portion of the check device is located is provided with a second color marker for indication as abnormal.

5. The check device according to claim 2, wherein a lower end of the upper pillar portion where the step portion of the check device is located is provided with a color marker for indication as normal and the inclined surface is provided with a color marker for identification as normal.

6. A method for checking for misalignment or twisting during operation of the battery cell activation tray using the check device of claim 1, comprising:

preparing the battery cell activation tray;

inserting the check device into the separation space between the fence and the vertical sidewall from the lower pillar portion from top to bottom in a state where the first surface is placed in contact with the vertical sidewall of the inner tray; and determining a case that, when the lower pillar portion is inserted into the separation space and the upper pillar portion is caught on the fence, as normal, and a case that, when the lower pillar portion is caught on the fence or the upper pillar portion is inserted into the separation space, as abnormal, in the process of inserting the check device.

7. A method for checking for misalignment or twisting during operation of the battery cell activation tray using the check device of claim 1, comprising:

preparing the battery cell activation tray;

inserting the check device into the separation space between the fence and the vertical sidewall from the lower pillar portion from a distal edge of the inner tray toward a center of the vertical sidewall of the inner tray, in a state where the first surface is placed in contact with the fence adjacent to the distal edge of the inner tray; and determining a case that, when the lower pillar portion is inserted into the separation space and the upper pillar portion is caught on the vertical sidewall of the inner tray, as normal, and a case that, when the lower pillar portion is caught on the vertical sidewall structure of the inner tray or the upper pillar portion is inserted into the separation space, as abnormal, in the process of inserting the check device.

\* \* \* \* \*